(12) United States Patent
Schwab et al.

(10) Patent No.: US 7,437,293 B1
(45) Date of Patent: Oct. 14, 2008

(54) DATA TRANSMISSION SYSTEM WITH ENHANCEMENT DATA

(75) Inventors: Barry H. Schwab, West Bloomfield, MI (US); John G. Posa, Ann Arbor, MI (US)

(73) Assignee: Videa, LLC, Ann Arbor, MI (US)

( * ) Notice: Subject to any disclaimer, the term of this patent is extended or adjusted under 35 U.S.C. 154(b) by 1521 days.

(21) Appl. No.: 09/877,628

(22) Filed: Jun. 8, 2001

Related U.S. Application Data

(60) Provisional application No. 60/210,879, filed on Jun. 9, 2000.

(51) Int. Cl.
*G10L 21/00* (2006.01)
(52) U.S. Cl. ............... 704/270.1; 704/270; 704/258; 704/275; 379/88.13; 709/231
(58) Field of Classification Search .......... 704/270, 704/275, 270.1, 258, 235, 260, 231, 251, 704/246; 379/88.13, 88.01, 100.08; 709/246, 709/231; 710/65
See application file for complete search history.

(56) References Cited

U.S. PATENT DOCUMENTS

| | | | | |
|---|---|---|---|---|
| 5,111,409 A | * | 5/1992 | Gasper et al. ............ 715/500.1 |
| 5,802,314 A | * | 9/1998 | Tullis et al. ................ 709/246 |
| 5,911,129 A | * | 6/1999 | Towell .................... 704/270.1 |
| 6,035,273 A | * | 3/2000 | Spies ......................... 704/270 |
| 6,122,682 A | * | 9/2000 | Andrews ..................... 710/65 |
| 6,157,706 A | * | 12/2000 | Rachelson ............. 379/100.08 |
| 6,240,391 B1 | * | 5/2001 | Ball et al. .................... 704/270 |
| 6,252,588 B1 | * | 6/2001 | Dawson ...................... 715/752 |
| 6,301,339 B1 | * | 10/2001 | Staples et al. ............ 379/93.01 |
| 6,327,343 B1 | * | 12/2001 | Epstein et al. ........... 379/88.01 |
| 6,385,306 B1 | * | 5/2002 | Baxter, Jr. ................ 379/88.13 |
| 6,801,931 B1 | * | 10/2004 | Ramesh et al. ............. 709/206 |
| 6,963,839 B1 | * | 11/2005 | Ostermann et al. .......... 704/260 |
| 2001/0013001 A1 | * | 8/2001 | Brown et al. ............ 704/270.1 |

\* cited by examiner

*Primary Examiner*—Vijay B Chawan
(74) *Attorney, Agent, or Firm*—Gifford, Krass, Sprinkle, Anderson & Citkowski, PC

(57) ABSTRACT

A method of enhancing an electronic communication is disclosed, be it in the form of a message, file, or other type of transmission. The method includes the steps of transmitting and receiving a message or file with a content and, along with the message or file, transmitting and receiving enhancement information enabling a recipient of the message or file to more fully appreciate the content. In one embodiment, the enhancement information enables the recipient to visualize the sender or listen to the content of a message. For example, the enhancement information may include phonemes enabling the recipient to listen to the content of a message in a synthesized voice of the sender. In all embodiments, the enhancement information may be stored at the location of the recipient to limit the need for retransmission thereof.

1 Claim, 1 Drawing Sheet

DATA TRANSMISSION SYSTEM WITH ENHANCEMENT DATA

REFERENCE TO RELATED APPLICATION

This application claims priority from U.S. provisional patent application Ser. No. 60/210,879, filed Jun. 9, 2000, the entire contents of which are incorporated herein by reference.

FIELD OF THE INVENTION

This invention relates to personal computers and, more particularly, to a system for conveying enhancement information as part of a data file or communication.

BACKGROUND OF THE INVENTION

Many aspects of today's everyday life are influenced by computer technology, resulting in a reliance on communications media such as Electronic Mail, answering machines, computer-simulated voices to effect automated call routing, etc. However, these relatively impersonal techniques sometimes fail to convey subtle information which affects the interpretation of their message. In addition, the increased sophistication of these electronic tools sometimes leads to unforeseen complications, which may increase the complexity of functions which they are intended to simplify.

SUMMARY OF THE INVENTION

This invention resides in a method of enhancing an electronic communication, whether in the form of a message, file, or other type of transmission. The method includes the steps of transmitting and receiving a message or file with a content and, along with the message or file, transmitting and receiving enhancement information enabling a recipient of the message or file to more fully appreciate the content.

In one embodiment, the enhancement information enables the recipient to visualize the sender or listen to the content of a message. For example, the enhancement information may include phonemes enabling the recipient to listen to the content of a message in a synthesized voice of the sender.

In all embodiments, the enhancement information may be stored at the location of the recipient to limit the need for retransmission thereof.

DETAILED DESCRIPTION OF THE INVENTION

Figure 1:
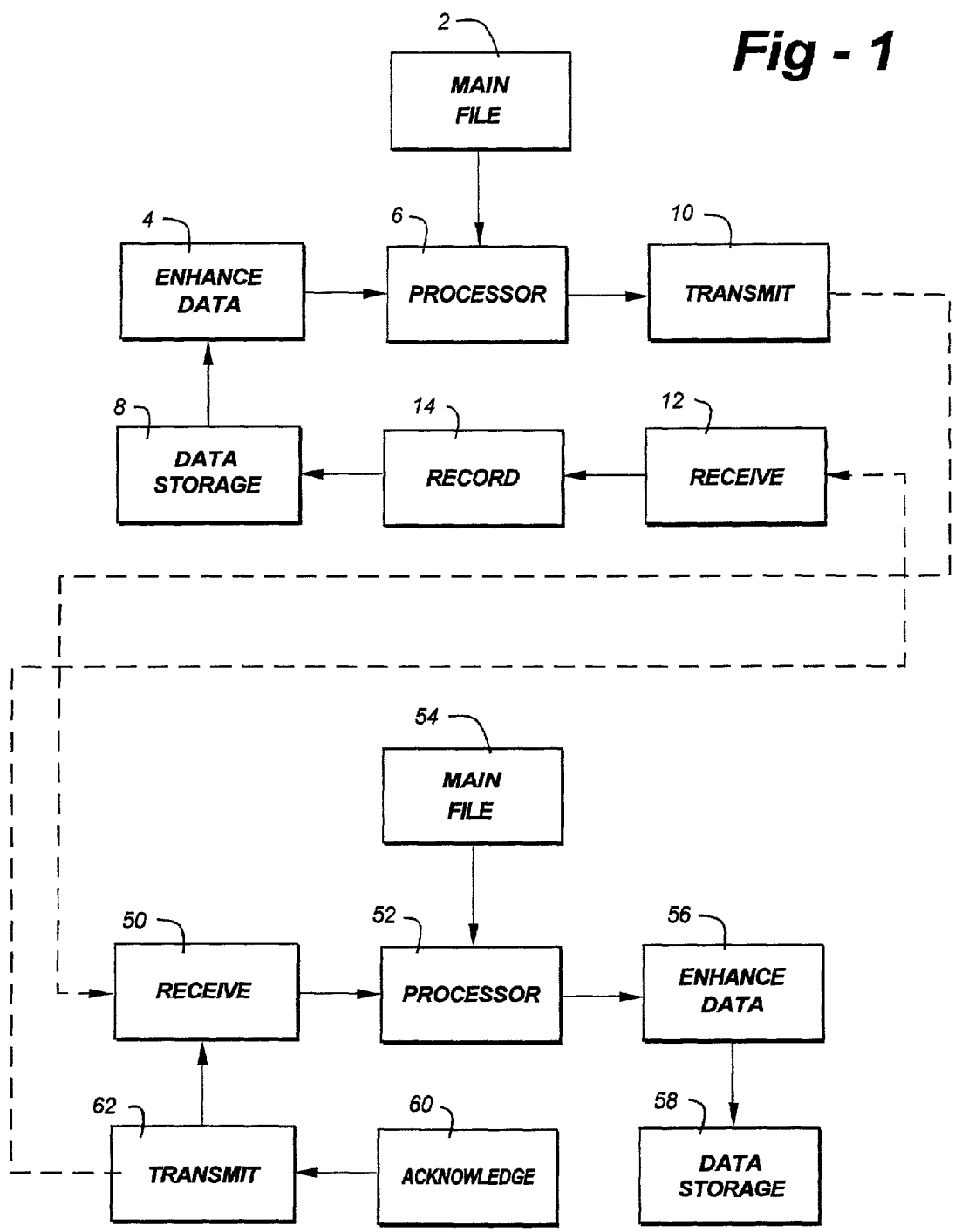
FIG. 1 shows an example of one possible implementation of the invention

In its broadest form, the invention envisions a data file representing some information to be conveyed, as, for example, an e-mail transmission. To this data file is added "helper information", which enhances the value of the original file; in practice, this helper information might include phonemes customized to the sender, such that when the e-mail is received, the phonemes will enable the recipient to listen to the e-mail in the voice of the sender. As a further enhancement, the helper file could include image information representative of the sender, providing the ability for the recipient to construct a moving image in which the sender would be shown speaking the words of the message as they are played back. If the sender has knowledge that the intended recipient already has the helper information, then it would be possible to omit the retransmission of this information, thereby minimizing the overall size of the data file to be transmitted. Alternatively, the retransmission of this customized helper information would enable the recipient to receive updated versions of this information as technology for reproduction improves, or to accurately portray the inevitable physical aging of the sender over time. Other useful information, such as a program to perform the reconstruction of the moving images, could also be distributed as part of the helper information. In addition, the system would be capable of learning useful information, such as the pronunciation of particular words or technical terms. Each sender would be able to maintain records of which words or other helper information which previously had been transmitted to a particular recipient.

An alternative implementation would include provisions for an automatic response to an incoming message. Whether triggered by a voice-mail message or an e-mail message, a response would be returned to the source of the original message. This response could take the form of an e-mail delivery receipt, a "read" receipt, or an "out-of-office" notification. Routing of a response would be directed by return information included in the incoming message, such as a return address, Caller-ID information, or routing information stored in an address-book-type data repository.

A third example would be the inclusion of helper information in a document file. With current word processor programs, if a word is unknown to the local computer or its custom dictionary, it may be marked as misspelled. For a large document, one which has sections with British spellings of words in addition to American spellings, or one which contains many technical terms, there may be so many words detected as misspelled that the system is overloaded, and it will cease the marking of words that it does not recognize. In this case, the spelling checker no longer will be functional. However, the inclusion of helper information, in the form of custom dictionary additions or special grammatical rules, would enable the spell-checking feature to continue to be functional FIG. 1 shows an example of one possible implementation of the invention. A main file 2 is to be sent to an e-mail recipient. Enhancement data 4 is to be included, providing additional capabilities, such as phonemes to allow a voice reconstruction of the message, and an implementation program to utilize these phonemes to perform the speech synthesis. These elements (the enhancement data including the speech synthesis implementation program) are combined with the main file by processor 6, and transmitted as 10 to the intended recipient.

Various types of enhancement data and implementation programs preferably are stored in a local data storage unit 8, although these types of data optionally may be stored on a local- or wide-area network (not shown). In addition, the data storage unit may include a database, which maintains records of which e-mail recipients already have received the enhancement data and implementation program, thereby avoiding unnecessary and redundant transmissions to these recipients.

The e-mail message is received as 50 and passed to processor unit 52, which splits the received data and extracts the original main file as 54 and the enhancement data 56 (which will include the original enhancement data, as well as any implementation program that may be required). At this point, the user may choose to retain the data elements received, in which case these elements will be stored on the data storage unit 58, which also may maintain a database of all elements that have been received. This data storage unit, like that of the sender, alternatively may reside on a local- or wide-area network.

In order to maximize the efficiency of the system, it will be advantageous to provide some form of query-response capability, so that a sender may interrogate the system of the intended recipient, and thereby determine whether or not it is necessary to transmit a particular enhancement data element. It is anticipated that many implementation programs may become standardized and universally available (such as the "Acrobat" reader produced by Adobe Systems or the "Quicktime" software available for various platforms), and these "plug-in" style programs eventually may be supplied as part of personal computer operating systems or Mail software. Another option would be for these elements to be maintained in a central repository, where, for example, a database of mail recipient system facilities could be utilized to determine whether an element needed to be attached to an e-mail message before forwarding it to that recipient or even allowing a recipient to access this repository to selectively download various personalized enhancement data, implementation programs, or other data enhancement elements.

As an option, the receiving system, via processor unit 52, may transmit an acknowledgment message 60, either automatically upon receipt of the message, or in response to the user allowing any data enhancement elements to be stored on the recipient's data storage unit 58. This message is transmitted as 62, and received as 12 by the original sender; in an alternative embodiment, this message may be "pre-addressed" by the sender as part of an overall management system, in which case it may be directed to a centralized facility organized to maintain these records. The received message may be used a simple confirmation of delivery, or it may be utilized to create a record 14 to be stored in the database facilities of the data storage unit 8.

The various transmitter and receiver functions, as 10, 12, 50, and 62, may be implemented as local- or wide-area network components (such as network interface cards or cable modems) or may be part of a wireless interconnection system.

Various types of enhancement data and implementation programs are possible, including those based on audio, video, textural, or graphical data, and utilized for functionality such as voice synthesis, animation, or configuration of the recipient machine for audio, video, textural, graphical, or operating mode. Many other alternative applications are possible within the scope of the invention, all within the overall concept of inclusion of helper information specific to the particular data file or a collection of data files of a common type.

We claim:

1. A method of enhancing an electronic communication, comprising the steps of:

transmitting and receiving a message or file having a content; and storing, at the location of a recipient, enhancement information enabling the recipient to visualize the sender.

\* \* \* \* \*